United States Patent
Shin et al.

(10) Patent No.: US 11,575,123 B2
(45) Date of Patent: Feb. 7, 2023

(54) NEGATIVE ELECTRODE FOR LITHIUM SECONDARY BATTERY AND LITHIUM SECONDARY BATTERY INCLUDING THE SAME

(71) Applicant: LG CHEM, LTD., Seoul (KR)

(72) Inventors: Sun-Young Shin, Daejeon (KR); Dong-Hyuk Kim, Daejeon (KR); Yong-Ju Lee, Daejeon (KR); Je-Young Kim, Daejeon (KR); Su-Min Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 346 days.

(21) Appl. No.: 16/836,554

(22) Filed: Mar. 31, 2020

(65) Prior Publication Data

US 2020/0235383 A1    Jul. 23, 2020

Related U.S. Application Data

(63) Continuation of application No. PCT/KR2018/015005, filed on Nov. 29, 2018.

(30) Foreign Application Priority Data

Dec. 1, 2017    (KR) .................... 10-2017-0164418

(51) Int. Cl.
*H01M 4/36* (2006.01)
*H01M 4/485* (2010.01)
(Continued)

(52) U.S. Cl.
CPC ........... *H01M 4/364* (2013.01); *H01M 4/134* (2013.01); *H01M 4/366* (2013.01); *H01M 4/386* (2013.01);
(Continued)

(58) Field of Classification Search
CPC ............ H01M 4/36; H01M 4/28; H01M 4/62; H01M 4/485; H01M 4/587
See application file for complete search history.

(56) References Cited

U.S. PATENT DOCUMENTS

2002/0164479 A1    11/2002    Matsubara et al.
2004/0042954 A1*    3/2004    Park .................... H01M 4/60
                                                                423/460
(Continued)

FOREIGN PATENT DOCUMENTS

CN        1667855 A    9/2005
CN        103107335 A    5/2013
(Continued)

OTHER PUBLICATIONS

Machine Translation of: JP 2013200984 A, Asami et al., Oct. 3, 2013.*

(Continued)

*Primary Examiner* — Kenneth J Douyette
(74) *Attorney, Agent, or Firm* — Birch, Stewart, Kolasch & Birch, LLP (57) ABSTRACT

A negative electrode which satisfies a need for high energy density while allowing high-speed charging of a battery. A lithium secondary battery including the negative electrode is also provided. The negative electrode includes: a first negative electrode active material having a first core including a silicon oxide-based composite and a carbon coating layer covering the first core including a silicon oxide-based composite; and a second negative electrode active material having a second core including an artificial graphite and a carbon coating layer covering the second core.

10 Claims, 4 Drawing Sheets

(51) Int. Cl.
H01M 4/587 (2010.01)
H01M 4/62 (2006.01)
H01M 10/0525 (2010.01)
H01M 4/134 (2010.01)
H01M 4/38 (2006.01)
H01M 4/48 (2010.01)
H01M 4/02 (2006.01)

(52) U.S. Cl.
CPC .............. *H01M 4/48* (2013.01); *H01M 4/485* (2013.01); *H01M 4/587* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 2005/0186475 A1 | 8/2005 | Jeong et al. |
| 2005/0233213 A1 | 10/2005 | Lee |
| 2007/0224508 A1 | 9/2007 | Aramata et al. |
| 2012/0321960 A1* | 12/2012 | Kim .................. H01M 4/133 423/445 R |
| 2013/0089784 A1 | 4/2013 | Cho et al. |
| 2013/0337325 A1 | 12/2013 | Jung et al. |
| 2014/0170485 A1 | 6/2014 | Lee et al. |
| 2014/0322611 A1* | 10/2014 | Lee .................. H01M 4/1393 427/215 |
| 2014/0356724 A1 | 12/2014 | Iwami |
| 2015/0099174 A1 | 4/2015 | Ren et al. |
| 2015/0140434 A1* | 5/2015 | Jung .................. H01M 4/131 429/231.95 |
| 2016/0141600 A1 | 5/2016 | Furuya et al. |
| 2016/0190552 A1 | 6/2016 | Murata et al. |
| 2016/0372753 A1 | 12/2016 | Fukasawa et al. |
| 2017/0012282 A1* | 1/2017 | Kondo .................. H01M 4/133 |
| 2017/0033353 A1* | 2/2017 | Behan .................. H01M 4/134 |
| 2018/0090750 A1 | 3/2018 | Oh et al. |

FOREIGN PATENT DOCUMENTS

| | | | |
|---|---|---|---|
| CN | 103891014 A | | 6/2014 |
| CN | 104011924 A | | 8/2014 |
| JP | 2002-260658 A | | 9/2002 |
| JP | 2005-294079 A | | 10/2005 |
| JP | 2010-177070 A | | 8/2010 |
| JP | 2012-33317 A | | 2/2012 |
| JP | 4985949 B2 | | 7/2012 |
| JP | 2013-200984 A | | 10/2013 |
| JP | 2013200984 A | * | 10/2013 |
| JP | 2016-100047 A | | 5/2016 |
| KR | 10-2005-0087147 A | | 8/2005 |
| KR | 10-2013-0135071 A | | 12/2013 |
| KR | 10-2015-0075207 A | | 7/2015 |
| KR | 10-1586816 B1 | | 1/2016 |
| KR | 10-2016-0030276 A | | 3/2016 |
| KR | 10-1676405 B1 | | 11/2016 |

OTHER PUBLICATIONS

Extended European Search Report for European Application No. 18883231.5, dated Oct. 14, 2020.
International Search Report for PCT/KR2018/015005 (PCT/ISA/210) dated Mar. 19, 2019.

\* cited by examiner

NEGATIVE ELECTRODE FOR LITHIUM SECONDARY BATTERY AND LITHIUM SECONDARY BATTERY INCLUDING THE SAME

TECHNICAL FIELD

The present application is a By-Pass Continuation of International Application PCT/KR2018/015005, filed Nov. 29, 2018, which claims priority to Korean Patent Application No. 10-2017-0164418 filed on Dec. 1, 2017 in the Republic of Korea, the disclosures of which are incorporated herein in their entirety by reference.

The present disclosure relates to a negative electrode for a lithium secondary battery and a lithium secondary battery including the same.

BACKGROUND ART

Recently, active studies have been conducted about metals, such as Si and Sn, in order to improve the energy density of a negative electrode material for a lithium secondary battery. Particularly, a silicon-based negative electrode has a high theoretical capacity of silicon of 4,200 mAh/g, which is at least 10 times higher than the theoretical capacity (370 mAh/g) of a carbon-based negative electrode. Particularly, silicon oxides have been studied intensively since they show relatively insignificant problems of volumetric swelling/shrinking during charge/discharge among the silicon-based materials.

Meanwhile, a need for high-speed charging has been increased significantly in the batteries or a part of compact battery models used for electric vehicles, such as hybrid electric vehicles, recently. In the case of such batteries requiring high-speed charging, use of a silicon-based negative electrode is not preferred, since the silicon-based negative electrode has low electrical conductivity.

DISCLOSURE

Technical Problem

The present disclosure is designed to solve the problems of the related art, and therefore the present disclosure is directed to providing a negative electrode for a lithium secondary battery which allows high-speed charging while using the high energy density of a silicon-based negative electrode.

The present disclosure is also directed to providing a lithium secondary battery including the negative electrode for a lithium secondary battery.

Technical Solution

According to the first embodiment of the present disclosure, there is provided a negative electrode which includes: a first negative electrode active material having a first core including a silicon oxide-based composite and a carbon coating layer covering the first core; and a second negative electrode active material having a second core having artificial graphite and a carbon coating layer covering the second core, wherein the silicon oxide-based composite is represented by the formula of $M-SiO_x$ ($0<x\leq2$), wherein M is chemically bound to silicon oxide or doped to silicon oxide while reducing silicon oxide and M is an element from Group Ia, IIa, VIa or IIIb in the Periodic Table, and the carbon coating layer of the first core has higher crystallinity compared to the carbon coating layer of the second core. In the context of the present disclosure M may be doped to silicon oxide while reducing silicon oxide. By way of explanation, silicon oxides are comprised of nano-domains of Si, $SiO_2$ and $SiO_x$, and the silicon oxides may be coated with a carbon coating layer. For instance, when Mg is doped into the silicon oxides, Mg can be easily reduced since Mg can bond with oxygen strongly (i.e., $SiO_2+2\,Mg\rightarrow Si+2\,MgO$). Furthermore, if the temperature is adjusted within a certain range, silicates can be formed from the following reactions: $SiO_2+2\,MgO\rightarrow Mg_2SiO_4$ and $SiO_2+MgO\rightarrow MgSiO_3$.

According to the second embodiment of the present disclosure, there is provided the negative electrode as defined in the first embodiment which includes only the first negative electrode active material and the second negative electrode active material as an electrode active material.

According to the third embodiment of the present disclosure, there is provided the negative electrode as defined in the first or the second embodiment, wherein the carbon coating layer of the second core has a larger full width at half maximum (FWHM) value of D band in the Raman spectrum as compared to the FWHM value of D band in the Raman spectrum of the carbon coating layer of the first core.

According to the fourth embodiment of the present disclosure, there is provided the negative electrode as defined in any one of the first to the third embodiments, wherein the FWHM value of D band in the Raman spectrum of the carbon coating layer of the second core is at least 2.1 times larger than the FWHM value of D band in the Raman spectrum of the carbon coating layer of the first core.

According to the fifth embodiment of the present disclosure, there is provided the negative electrode as defined in any one of the first to the fourth embodiments, wherein the FWHM value of D band in the Raman spectrum of the carbon coating layer of the second core is at least 1.3 times larger than the FWHM value of D band in the Raman spectrum of the carbon coating layer of the first core.

According to the sixth embodiment of the present disclosure, there is provided the negative electrode as defined in any one of the first to the fifth embodiments, wherein a weight ratio range of the first negative electrode active material to the second negative electrode active material may be from 3:97-15:85.

According to the seventh embodiment of the present disclosure, there is provided the negative electrode as defined in any one of the first to the sixth embodiments, wherein M is any one element selected from the group consisting of Li, Mg, Na, K, Ca, Sr, Ba, Ti, Zr, B and Al.

According to the eighth embodiment of the present disclosure, there is provided the negative electrode as defined in any one of the first to the seventh embodiments, wherein the metal (M) may be present in an amount of 4 wt % to 20 wt % based on 100 wt % of the silicon oxide-based composite.

According to the ninth embodiment of the present disclosure, there is provided the negative electrode as defined in any one of the first to the eighth embodiments, wherein each of the carbon coating layers of the first core and the second core independently has a thickness of 10 nm to 100 nm.

According to the tenth embodiment of the present disclosure, there is provided a lithium secondary battery including the negative electrode as defined in any one of the first to the ninth embodiments.

Advantageous Effects

According to the present disclosure, a silicon oxide-based composite is coated with a crystalline carbon coating layer having high electrical conductivity to supplement relatively low electrical conductivity of the silicon oxide-based composite so that it may be used as the first negative electrode active material. In addition, artificial graphite is coated with an amorphous carbon coating layer having high lithium ion conductivity so that it may be used as the second negative electrode active material. The first negative electrode active material in combination with the second negative electrode active material is used as a negative electrode active material is used. Thus, according to the present disclosure, it is possible to provide a negative electrode having high energy density, decreased irreversible capacity and high electrical conductivity and lithium ion conductivity.

In addition, a lithium secondary battery including the above-mentioned negative electrode causes minimal degradation of capacity, even when repeating charge/discharge cycles.

BEST MODE

In one aspect of the present disclosure, there is provided a negative electrode which includes: a first negative electrode active material having a first core including a silicon oxide-based composite and a carbon coating layer covering the first core; and a second negative electrode active material having a second core including artificial graphite and a carbon coating layer covering the second core, wherein the silicon oxide-based composite is represented by the formula of M—$SiO_x$ (0<x≤2), wherein M is chemically bound to silicon oxide or doped with silicon oxide while reducing silicon oxide and M is an element from Group Ia, IIa, VIa or IIIb in the Periodic Table, and the carbon coating layer of the first core has higher crystallinity compared to the carbon coating layer of the second core. A secondary battery including the negative electrode is also provided.

According to an embodiment, the first negative electrode active material having a first core including a silicon oxide-based composite and a carbon coating layer covering the first core including a silicon oxide-based composite and the second negative electrode active material having a second core comprising artificial graphite and a carbon coating layer covering the second core are used for the negative electrode in a mixed form.

(1) First Negative Electrode Active Material

The first negative electrode active material used according to the present disclosure includes a silicon oxide-based composite first core and a carbon coating layer formed thereon and having relatively high crystallinity.

The silicon oxide-based composite is represented by the formula of M-$SiO_x$ (0<x≤2), wherein M is chemically bound to silicon oxide or doped to silicon oxide while reducing silicon oxide and M is an element from Group Ia, Ia, VIa or IIIb in the Periodic Table. Preferably, M is any one element selected from the group consisting of Li, Mg, Na, K, Ca, Sr, Ba, Ti, Zr, B and Al, and M is more preferably Li or Mg.

According to an embodiment of the present disclosure, non-limiting examples of M-$SiO_x$ (0<x≤2) include: i) Si, ii) silicon oxide represented by the formula of $SiO_x$ (0<x≤2), and iii) a silicon oxide composite containing magnesium silicate containing Si and Mg as a nano-sized domain, and particular examples thereof include, but are not limited to: i) Si, ii) silicon oxide represented by the formula of $SiO_x$ (0<x≤2), and iii) a silicon oxide composite containing magnesium silicate, such as $MgSiO_3$, $Mg_2SiO_4$ or a combination thereof, as a nano-sized domain.

According to another embodiment of the present disclosure, silicon in the silicon oxide-based composite may be present in the form of a plurality of silicon phases including crystalline silicon. Particularly, the silicon phases may be distributed homogeneously and embedded/buried in a matrix including the silicon oxide-based composite. In other words, the silicon phases may be scattered and homogeneously distributed in the matrix. The silicon phase is formed by assembly of one or more silicon crystals, and a single group may be present or two or more groups may be present.

According to the present disclosure, the matrix portion (silicon oxide composite) is non-reactive with Li and causes no Li intercalation/deintercalation during charge. Although Si forms a composite with Li to contribute to charge/discharge of a battery, the composite has a problem of a severe change in volume during charge/discharge. To solve the problem, a negative electrode material using microcrystalline Si or a composite of Si with $SiO_2$ has been developed. However, $SiO_2$ forms $LiO_2$ or Li—S—O during the initial charge to generate irreversible capacity undesirably. Thus, the present disclosure has paid attention to reducing generation of such initial irreversible capacity by incorporating a metal element having a binding force equal to or higher than the binding force of Li to a silicon oxide-based composite. According to the present disclosure, the silicon oxide-based composite includes a metal (M)-silicon composite oxide and silicon oxide ($SiO_x$ (0<x≤2)), wherein the metal (M) is at least one selected from Li, Mg, Na, K, Ca, Sr, Ba, Ti, Zr, B and Al, preferably Mg. In addition, the metal (M)-silicon oxide-based composite includes magnesium silicate (Mg-silicate), wherein the Mg-silicate includes at least one of $MgSiO_3$ and $Mg_2SiO_4$. In the silicon oxide-based composite, metal silicate and silicon oxide are present in such a state that the elements of each phase are diffused so that the boundary surface of one phase is bound to that of another phase, i.e., the phases are bound to each other in an atomic level, and thus undergo minimal change in volume during lithium ion intercalation/deintercalation and cause no cracking of silicon oxide-based composite particles even after repeating charge/discharge.

In addition, according to still another embodiment of the present disclosure, the metal (M) may be present in an amount of 4 wt % to 20 wt %, 4 wt % to 16 wt %, or 4 wt % to 12 wt % based on 100 wt % of the silicon oxide-based composite. When the metal (M) content satisfies the range of 4 wt % to 20 wt %, it is possible to improve efficiency while minimizing a decrease in capacity.

According to yet another embodiment of the present disclosure, Si crystallite may have a size of 1 nm to 15 nm in the silicon oxide-based composite. When the Si crystal size, i.e. crystallite size is larger than the above-defined range, life characteristics may be degraded.

Meanwhile, $SiO_x$ may be micronized so that the crystallinity may not be observed through X-ray diffractometry (XRD).

According to an embodiment of the present disclosure, the silicon oxide-based composite may have a plurality of pores present inside of the body and on the outer surface thereof. The pores may be opened and/or closed and two or more open pores may be interconnected. In addition, ingredients, such as ion, gas and liquid, may pass through the silicon oxide-based composite particles through the interconnected pores. According to another embodiment of the present disclosure, the pores may have a diameter of 2 nm to 1 µm based on the largest diameter of pores. Preferably, the pore diameter may be 500 nm or less, 200 nm or less, 100 nm or less, or 50 nm or less.

An embodiment of the method for preparing the silicon oxide composite may include the steps of: i) reacting $SiO_x$ (0<x<2) gas with metal (M) gas and carrying out cooling to deposit a silicon oxide composite; and ii) pulverizing the deposited silicon oxide composite.

Herein, the cooling may be carried out at a temperature between 400° C.-900° C. In addition, the heat treatment step may be carried out at a temperature between 850° C.-1,150° C. for 30 minutes to 8 hours. According to an embodiment of the present disclosure, the $SiO_x$ (0<x<2) gas may be prepared by allowing $Si/SiO_2$ to evaporate at a temperature ranging from 1,000° C. to 1,800° C., and the metal (M) gas may be prepared by allowing metal (M) to evaporate at a temperature ranging from 800° C. to 1,600° C. The reaction of $SiO_x$ (0<x<2) gas with metal (M) gas may be carried out at 800° C.-1800° C. Then, quenching may be carried out to a target cooling temperature of 400° C.-900° C., particularly 500° C.-800° C., within 1 hour-6 hours. When the quenching time satisfies 1 hour-6 hours after the vapor phase reaction of $SiO_x$ (0<x<2) gas with metal (M) gas, such quenching to a low temperature within a short time can solve the problem of insufficient reaction of gaseous metal (M) with $SiO_x$ which results in a failure in formation of silicate and a residual undesired phase, such as MgO. Thus, it is possible to significantly improve the initial efficiency and an effect of preventing swelling, thereby providing significantly improved life of a battery. After cooling, heat treatment may be further carried out, wherein the size of Si crystallites and Mg silicate proportion may be controlled depending on heat treatment temperature. For example, when the additional heat treatment is carried out at high temperature, the $Mg_2SiO_4$ phase may be increased and the Si crystallite size may be increased. For instance, applying a temperature of 1400° C. or higher may result in formation of more $Mg_2SiO_4$ phase compared to $MgSiO_3$ phase.

To prepare the silicon oxide-based composite, a vapor deposition reactor may be used. For example, such a vapor deposition reactor may include a fill port, gas suction port and a discharge port connected to a deposition chamber. As carrier gas, hydrogen, helium, nitrogen, argon or a combination thereof may be used. While the carrier gas is introduced to the vapor deposition reactor through the gas suction port, a precursor compound forming the silicon oxide-based composite may also be introduced into the reactor together with the carrier gas. Then, while the precursor compound is adsorbed chemically onto the substrate surface in the reactor, a silicon oxide-based composite may be deposited in a bulk state.

According to an embodiment of the present disclosure, the deposited silicon oxide composite may include a crystalline silicon phase and a matrix in which the silicon phase is dispersed, wherein the matrix includes Mg-silicate and silicon-oxide. In addition, it is possible to form the silicon phase and matrix into a size corresponding to microcrystals of about 100 nm by selecting a composition similar to the composition at the eutectic point.

Next, the silicon oxide composite may be pulverized to a particle diameter ($D_{50}$) of 0.1 µm to 20 µm through a mechanical milling process, or the like.

The first negative electrode active material according to the present disclosure includes a crystalline carbon coating layer covering at least a part of, preferably the entirety of the surface of silicon oxide-based composite. It is preferred that the crystalline carbon coating layer provides sufficient electrical conductivity and is formed to a thickness of 10 nm to 100 nm so that the high capacity of the silicon oxide-based composite may be realized. Within the above-defined range, the upper limit of the coating layer thickness may be 100 nm, 80 nm, 70 nm or 50 nm, and the lower limit thereof may be 10 nm, 15 nm, 25 nm, 35 nm or 50 nm.

Particular examples of the crystalline carbon include natural graphite or artificial graphite. Natural graphite is inexpensive and shows excellent voltage flatness and high capacity similar to the theoretical capacity, and thus is highly effective as an active material. However, it is difficult to carry out coating of the carbon composite core totally with a small and uniform thickness.

Thus, according to the present disclosure, while a carbon source gas is supplied to the core of the silicon oxide-based composite to carry out chemical vapor deposition (CVD), heat treatment is carried out under hydrogen or argon atmosphere to form a crystalline carbon coating layer.

The carbon source may include a carbon-containing compound having about 1-10 carbon atoms, but is not limited thereto. A particular example of the carbon source may include carbon monoxide, carbon dioxide, methane, ethane, ethylene, ethanol, acetylene, propane, propylene, butane, butylene, butadiene, pentane, pentene, pentyne, pentadiene, cyclopentane, cyclopentadiene, hexane, hexene, cyclohexane, cyclohexadiene, benzene, toluene or combinations thereof, but is not limited thereto.

It is possible to control the shape and thickness of the crystalline carbon coating layer through the feed flow rate of the carbon source gas and heat treatment temperature/time. According to an embodiment of the present disclosure, the carbon source gas may be supplied at a flow rate of 0.1 sccm 100 sccm.

In addition, according to another embodiment of the present disclosure, the heat treatment may be carried out at a temperature of 850° C.-1150° C. at a warming rate of about 5° C./min for 1 hour-3 hours. When the heat treatment temperature is lower than the above-defined range, it is difficult to form a crystalline carbon coating layer. The method for forming a carbon coating layer is not limited to the above-mentioned method and any method may be selected suitably by those skilled in the art, as long as it can realize the above-described properties of the carbon coating layer.

(2) Second Negative Active Material

The negative electrode active material according to the present disclosure includes a combination of the first negative electrode active material with the second negative electrode active material, wherein the second negative electrode active material includes artificial graphite and an amorphous carbon coating layer formed at least partially on the surface of artificial graphite. The second negative electrode active material has a structure in which an amorphous carbon coating layer is formed at least partially, preferably entirely on the surface of the artificial graphite.

According to an embodiment of the present disclosure, artificial graphite may be present as secondary particles formed by the aggregation of primary particles.

The amorphous carbon coating layer may be formed on the artificial graphite to a thickness of 10 nm to 100 nm so that excellent electrical conductivity of artificial graphite may be realized and lithium ion conductivity may be improved. Within the above-defined range, the coating layer thickness may have an upper limit of 100 nm, 80 nm, 70 nm or 50 nm, and a lower limit of 10 nm, 15 nm, 25 nm, 35 nm or 50 nm.

The second negative electrode active material may be obtained with a structure in which the carbon coating layer is formed at least partially on the surface of artificial graphite by mixing artificial graphite with an amorphous carbon precursor and carrying out heat treatment. More particularly, the second negative electrode active material may be obtained by mixing artificial graphite with an amorphous carbon precursor, and heat treating the resultant mixture under $N_2$ atmosphere at a temperature of 900-1400° C. for about 3-15 hours.

Any amorphous carbon precursor may be used with no particular limitation, as long as it produces carbon by heat treatment. Particular examples of the amorphous carbon precursor include glucose, fructose, galactose, maltose, lactose, sucrose, phenolic resin, naphthalene resin, polyvinyl alcohol resin, urethane resin, polyimide resin, furane resin, cellulose resin, epoxy resin, polystyrene resin, resorcinol resin, phloroglucinol, coal-based pitch, petroleum-based pitch, tar, low-molecular weight heavy oil or combinations thereof. Preferably, the amorphous carbon precursor may be coal-based pitch, petroleum-based pitch, tar, low-molecular weight heavy oil or combinations thereof.

(3) Crystallinity of Carbon Coating Layers of First and Second Negative Electrode Active Materials As used herein, 'crystalline' and 'amorphous' used with reference to the coating layer of the negative electrode active material means 'perfectly crystalline' and 'perfectly amorphous', respectively. 'Perfectly crystalline' means a graphite structure. In order to form the graphite structure, it is possible to apply a heat treatment of 3000° C. or higher. However, since the temperature of heat treatment according to the present invention may be much lower than 3000° C., the resultant coating layer has a structure of soft carbon rather than a graphite structure. In addition, when the coating layer of the first negative electrode active material has relatively high crystallinity as compared to the coating layer of the second negative electrode active material, the coating layer of the first negative electrode active material is referred to as 'crystalline' and the coating layer of the second negative electrode active material is referred to as 'amorphous'.

According to the present disclosure, the crystallinity of the carbon coating layer can be determined by comparing full width at half-maximum (FWHM) values of D band in Raman spectroscopy. A larger FWHM value means a less amount of defects in the corresponding carbon coating layer and lower crystallinity.

Raman spectroscopy is a method for analyzing the structure of a carbon coating layer. In the Raman spectrum of a carbon coating layer, the peak present in a wave number region of about 1580 $cm^{-1}$ is called G band, which is a peak representing the $sp^2$ binding of the carbon coating layer and shows carbon crystals having no structural defects. Meanwhile, in the Raman spectrum, the peak present in a wave number region of about 1360 $cm^{-1}$ is called D band, which is a peak representing the $sp^3$ binding of the carbon coating layer and is increased when an atomic bond formed by $sp^2$ binding is cleaved and converted into $sp^3$ binding. Since such D band is increased when disorders or defects are generated in the carbon coating layer, G band of the Raman spectrum of the carbon coating layer may be a peak present in a wave number region of 1550 $cm^{-1}$ to 1620 $cm^{-1}$, and D band may be a peak present in a wave number region of 1330 $cm^{-1}$ to 1370 $cm^{-1}$. The wave number regions of G band and D band correspond to regions which can be shifted according to a laser beam source used for Raman spectroscopy. Although the Raman value is not particularly limited, it may be determined by using DXR Raman Microscope (Thermo Electron Scientific Instruments LLC) at a laser wavelength of 532 nm.

According to an embodiment of the present disclosure, the FWHM value of D band in the Raman spectrum of the carbon coating layer of the second negative electrode active material is at least 1.3 times, particularly 1.3-3 times larger, more particularly 1.3-2 times larger, at least 2.1 times larger, or at least 3 times larger than the FWHM value of D band in the Raman spectrum of the carbon coating layer of the first negative electrode active material. When FWHM value of D band in the Raman spectrum of the carbon coating layer of the first negative electrode active material is 1.3-3 times small than the FWHM value of D band in the Raman spectrum of the carbon coating layer of the second negative electrode active material, a larger amount of defects are generated in the carbon coating layer of the first negative electrode active material. Thus, the crystallinity of the carbon coating layer of the first negative electrode active material is higher than that of the carbon coating layer of the second negative electrode active material. Therefore, the carbon coating layer of the second negative electrode active material is relatively harder so that it may support the primary particles more firmly during Li ion intercalation/deintercalation to inhibit deformation of the particles. In addition, the coating layer of the first negative electrode active material has relatively high crystallinity, and thus it improves the conductivity of silicon oxide particles, thereby improving the overall life characteristics of a battery.

(4) Negative Electrode

The negative electrode according to the present disclosure includes the first negative electrode material and the second negative electrode active material in a mixed form as negative electrode active materials.

According to an embodiment of the present disclosure, the negative electrode active material substantially consists of the first negative electrode active material and the second negative electrode active material in a mixed form.

The first negative electrode active material particles may have an average particle diameter ($D_{50}$) of 7 μm or less. In addition, the second negative electrode active material particles may have an average particle diameter ($D_{50}$) of 15 μm to 23 μm. For example, the first negative electrode active material particles and the second negative electrode active material particles may have a spherical or pseudo-spherical shape, but are not limited thereto.

When each of the first negative electrode active material particles and the second negative electrode active material particles has an average particle diameter ($D_{50}$) less than the lower limit, the specific surface area is increased, thereby making it difficult to perform homogeneous mixing during the preparation of secondary battery electrode slurry. Thus, the negative electrode material may be distributed non-homogeneously, consumption of a binder required for manufacturing an electrode is increased, resulting in a decrease in efficiency of the process for manufacturing a negative electrode, and charge/discharge capacity per unit volume may be degraded. Meanwhile, if each of the first negative electrode active material particles and the second negative electrode active material particles has an average particle diameter ($D_{50}$) larger than the respective upper limits, it is difficult to manufacture an electrode membrane. Particularly, in the case of the first negative electrode active material, the silicon oxide-based composite undergoes volumetric swelling during charge/discharge to cause easy removal of powder from the current collector.

As used herein, 'average particle diameter (particle diameter)' means the value determined as a weight average value $D_{50}$ (particle diameter when the accumulated weight becomes 50% of the total weight or median diameter) in the particle size distribution determined by laser beam diffractometry.

The first negative electrode active material particles and the second negative electrode active material particles may be used at a mixing ratio of (first negative electrode material: second negative electrode material) 3:97 to 15:85, 5:95 to 10:90, or 10:90 to 15:85 on a weight basis. When the content of the first negative electrode active material is larger than the upper limit, the life characteristics of a battery are degraded significantly. When the content of the first negative electrode active material is smaller than the lower limit, battery capacity may be degraded undesirably.

The first negative electrode active material particles and the second negative electrode active material particles may be used in combination through simple mixing or mechanical milling by using a conventional method known to those skilled in the art. For example, the first negative electrode active material particles and the second negative electrode active material particles may be mixed simply by using a mortar, or may be mixed homogeneously through the mechanical application of compression stress by rotating them at a rotation number of 100 rpm-1000 rpm with a blade or a ball mill.

The mixed first negative electrode particles and second negative electrode active material particles are dispersed in a solvent, such as an organic solvent or water, together with a conductive material and a binder polymer to form negative electrode mixture slurry, and the slurry is coated onto at least one surface of a negative electrode current collector, followed by pressing and drying, to obtain a negative electrode.

The binder polymer is used to bind active material particles and to retain a shaped product. Non-limiting examples of the binder polymer include polytetrafluoroethylene (PTFE), polyvinylidene fluoride (PVdF), styrene butadiene rubber (SBR). Such binders are classified into a solvent-based binder (i.e., binder using an organic solvent as a solvent) such as polyvinylidene fluoride (PVdF) and an aqueous binder (i.e. binder using water as a solvent) such as styrene-butadiene rubber. The aqueous binder is economical and eco-friendly and is not harmful to the worker's health, unlike the solvent-based binder. In addition, the aqueous binder has a higher binding effect as compared to the solvent-based binder, and thus can increase the ratio of active material per the same volume to provide high capacity. Preferably, the aqueous binder is SBR. As widely known in the art, such an aqueous binder may be dispersed in water together with a thickening agent such as carboxymethyl cellulose (CMC) so that it may be applied to an electrode.

There is no particular limitation in the conductive material, as long as it causes no chemical change in an electrochemical device. In general, particular examples of the conductive material include acetylene black, carbon black, denka black, graphite, carbon fibers, carbon nanotubes, metal powder, conductive metal oxide, organic conductive material, or the like.

The solvent used for forming an electrode may include an organic solvent, such as N-methyl pyrrolidone (NMP), dimethyl formamide (DMF), acetone or dimethyl acetamide, or water. Such solvents may be used alone or in combination. However, when forming a negative electrode, water is used preferably as a solvent. It is preferred that the solvent is used in such an amount that the electrode active material, binder and conductive material may be dissolved and dispersed therein, considering the coating thickness of slurry and production yield.

(5) Lithium Secondary Battery

The negative electrode forms an electrode assembly together with a positive electrode including a positive electrode active material and a separator, and the electrode assembly and an electrolyte are received in a casing to provide a lithium secondary battery.

The positive electrode active material may be selected from a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+y}Mn_{2-y}O_4$ (wherein y is 0-0.33), $LiMnO_3$, $LiMn_2O_3$ or $LiMnO_2$; a lithium copper oxide ($Li_2CuO_2$); a vanadium oxide such as $LiV_3O_8$, $Li_3VO_4$, $V_2O_5$ or $Cu_2V_2O_7$; a Ni-site type lithium nickel oxide represented by the chemical formula of $LiNi_{1-y}M_yO_2$ (wherein M is Co, Mn, Al, Cu, Fe, Mg, B or Ga, and y is 0.01-0.3); a ternary lithium manganese composite oxide represented by the chemical formula of $LiMn_{2-y}M_yO_2$ (wherein M=Co, Ni, Fe, Cr, Zn or Ta, and y is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$; ternary lithium transition metal composite oxide represented by the chemical formula of $Li(Ni_aCo_bMn_c)O_2$ ($0<a<1$, $0<b<1$, $0<c<1$, $a+b+c=1$); or the like, but is not limited thereto.

The positive electrode active material may be dispersed in an organic solvent together with a binder polymer, conductive material and other additives to form positive electrode mixture slurry, and the slurry may be coated onto at least one surface of a positive electrode current collector, followed by drying and pressing, to form a positive electrode. The binder polymer, conductive material and other additives used for the positive electrode may be the same as or different from those used for the negative electrode. See, the above description with reference to the negative electrode.

Non-limiting examples of the positive electrode current collector include foil made of aluminum, nickel or a combination thereof, and those of the negative electrode current collector include foil made of copper, gold, nickel, copper alloy or a combination thereof.

The electrode includes conventional electrolyte ingredients, such as an electrolyte salt and an organic solvent. The electrolyte salt that may be used is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, $LiClO_4$, $LiCF_3SO_3$, $LiPF_6$, $LiAsF_6$, $LiN(CF_3SO_2)_2$ or a combination thereof may be used.

The organic solvent used in combination with the electrolyte may include a currently known solvent, such as a cyclic carbonate solvent; liner carbonate solvent; ester solvent; nitrile solvent; phosphate solvent; or a combination thereof, wherein the solvent may include a halogen substituent or not. For example, the organic solvent that may be used includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a combination thereof.

The lithium secondary battery according to an embodiment of the present disclosure may be provided in the form of a cylindrical, prismatic, pouch-type or coin-type battery, but its outer shape or casing is not limited thereto.

The lithium secondary battery according to an embodiment of the present disclosure may include any conventional lithium secondary batteries, such as a lithium metal secondary battery, lithium ion secondary battery, lithium polymer secondary battery or a lithium ion polymer secondary battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

A silicon oxide-based composite first core forming the first negative electrode active material was prepared as follows. Powdery Si and $SiO_2$ were mixed at a ratio (molar ratio) of 1:1 and heat treated under reduced pressure of 1 torr to allow evaporating the mixture in a vapor state of $SiO_x$ (0<x<2). Mg was also allowed to evaporate in a vapor state through heat treatment so that it may react with $SiO_x$ (0<x<2) at 1300° C. for 3 hours. Then, the reaction product was cooled on a plate at 800° C. within 4 hours so that it may be deposited on the substrate. The evaporation temperature of $Si/SiO_2$ was 1,400° C. and that of Mg was 900° C. The deposited product was Mg-$SiO_x$ (x<0≤2), a silicon oxide composite containing Mg. After carrying out inductively coupled plasma atomic emission spectrometry (ICP-AES), Mg concentration was 6 wt %. After carrying out X-ray diffractometry (CuKα), the silicon crystals had a size of 9 nm. The deposited silicon oxide composite Mg-$SiO_x$ in a bulk state was pulverized by using a jet mill to a diameter ($D_{50}$) of about 5 μm.

To form a carbon coating layer covering the silicon oxide-based oxide first core, Mg-$SiO_x$ was introduced to a chamber and methane gas was supplied thereto under an argon atmosphere to form a carbon coating layer at 950° C. through chemical vapor deposition (CVD). It was shown that the carbon coating layer had a thickness of 40 nm as determined by transmission electron microscopy (TEM) analysis. In this manner, the first negative electrode active material was obtained. The silicon oxide-based composite included: i) Si, ii) silicon oxide represented by the chemical formula of $SiO_x$ (x<0≤2), and iii) magnesium silicate containing Si and Mg as nano-sized domains.

In addition, to obtain the second negative electrode active material, secondary particles of artificial graphite used as a second core of the second negative electrode active material and pitch were heat treated at 1100° C. under $N_2$ atmosphere to carbonize pitch, thereby providing the second negative electrode active material including an artificial graphite core coated with the carbon coating layer. The second negative electrode active material had a diameter ($D_{50}$) of about 21 μm and the carbon coating layer had a thickness of 40 nm as determined by TEM analysis.

The first negative electrode active material and the second negative electrode active material were mixed at a weight ratio of 5:95, respectively, to prepare a negative electrode active material consisting of the first negative electrode active material and the second negative electrode active material.

The negative electrode active material, a conductive material and an organic binder polymer were used at a weight ratio of 96:1:3 and dispersed in water to prepare a negative electrode mixture. Acetylene black was used as the conductive material. Carboxymethyl cellulose (CMC) was used in combination with styrene-butadiene rubber (SBR) as the organic binder polymer. The negative electrode mixture was applied to copper foil as a negative electrode current collector having a thickness of 10 μm, followed by drying, to obtain a negative electrode sample. Then, roll pressing was carried out. Herein, the negative electrode had a loading amount of 250 mg/25 cm² and the roll pressing was carried out at 200 kg/5 cm, so that the negative electrode might have an electrode density of 1.6 g/cc.

Lithium metal was used as a positive electrode, and a polyethylene separator was interposed between the negative electrode and the positive electrode to form an electrode assembly. A non-aqueous electrolyte was prepared by adding 1M $LiPF_6$ to a non-aqueous electrolyte solvent containing ethylene carbonate and diethyl carbonate mixed at a volume ratio of 1:2. Then, the non-aqueous electrolyte was injected to the electrode assembly to obtain a coin-type secondary half-cell (CHC).

Reference Example

A carbon coating layer was formed on SiO by heat treating pitch under $N_2$ atmosphere at 1100° C. so that it might be carbonized in the same manner as Example 1, except that SiO having the same size and shape as secondary particles of artificial graphite was used as the second core of the second negative electrode active material instead of the secondary particles of artificial graphite.

Example 2

A coin-type secondary half-cell was obtained in the same manner as Example 1, except that the first negative electrode active material and the second negative electrode active material were used at a weight ratio of 10:90, respectively.

Comparative Example 1

A coin-type secondary half-cell was obtained in the same manner as Example 1, except that the first negative electrode active material was obtained by heat treating pitch and Mg-SiO$_x$ at 1100° C. to carbonize pitch, instead of using methane gas for preparing the first negative electrode active material and carrying out chemical vapor deposition at 950° C.

Comparative Example 2

A coin-type secondary half-cell was obtained in the same manner as Example 1, except that the second negative electrode active material was obtained by supplying methane gas to secondary particles of artificial graphite and carrying out chemical vapor deposition at 950° C. instead of carbonizing pitch at 1100° C. to perform coating of secondary particles of artificial graphite for preparing the second negative electrode active material.

Comparative Example 3

A coin-type secondary half-cell was obtained in the same manner as Example 1, except that the first negative electrode active material was obtained by heat treating pitch and Mg-SiO$_x$ at 1100° C. to carbonize pitch, instead of using methane gas for preparing the first negative electrode active material and carrying out chemical vapor deposition at 950° C., and the second negative electrode active material was obtained by using methane gas to carry out chemical vapor deposition at 950° C. for coating artificial graphite, instead of carbonizing pitch at 1100° C. to perform coating of secondary particles of artificial graphite for preparing the second negative electrode active material.

Comparative Example 4

A coin-type secondary half-cell was obtained in the same manner as Example 1, except that the negative electrode was obtained by using the second negative electrode active material alone without the first negative electrode active material.

Comparative Example 5

A coin-type secondary half-cell was obtained in the same manner as Example 1, except that the first negative electrode active material and the second negative electrode active material were used at a weight ratio of 20:80.

Test Example 1: Charge/Discharge Cycle Test

Each of the lithium secondary batteries according to Examples 1 and 2 and Comparative Examples 1-5 was charged/discharged first at 0.1 C/0.1 C and 25° C., and then a charge/discharge cycle test was carried out at 25° C. with a high-speed charging cycle of 3C-charge/0.5C-discharge.

Figure 1:
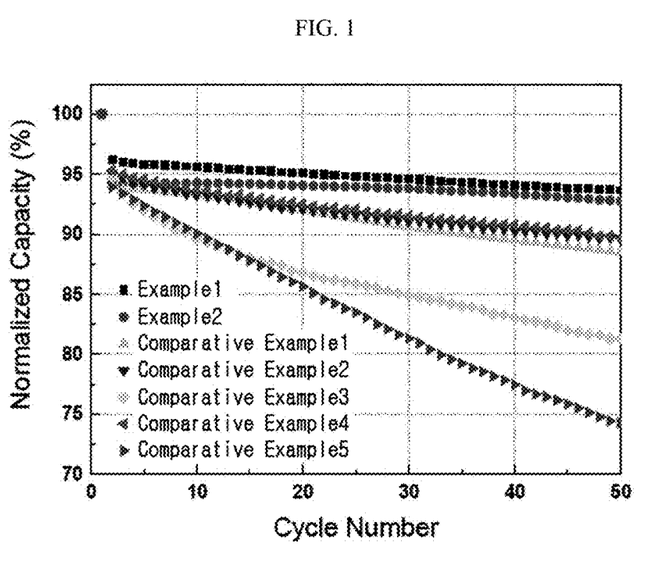
FIG. 1 is a graph illustrating the charge/discharge cycles of each of the lithium secondary batteries according to the Examples and Comparative Examples.

The results are shown in FIG. 1. Referring to FIG. 1, it can be seen that the lithium secondary batteries according to Examples 1 and 2 cause no rapid drop in capacity even when the cycle number is increased. This suggests that the secondary batteries have improved life.

Test Example 2: Transmission Electron Microscopic (TEM) Image

Figure 2:
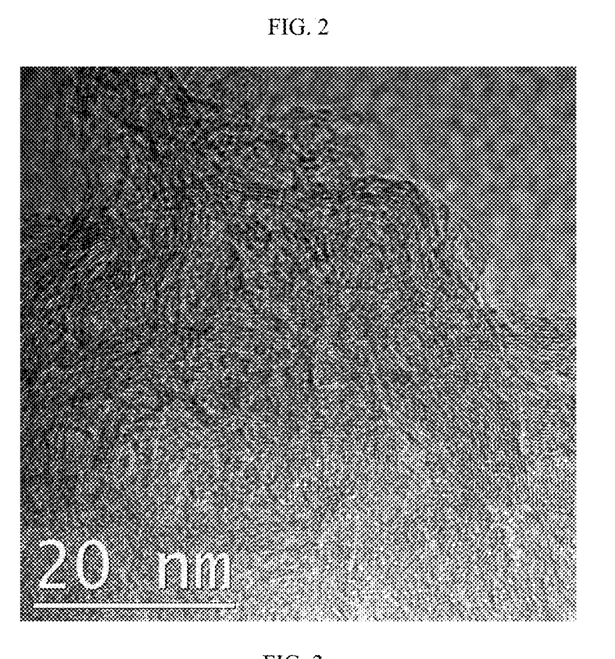
FIG. 2 is a transmission electron microscopic (TEM) image illustrating the coating layer of the first negative electrode active material according to an embodiment of the present disclosure.
Figure 3A:
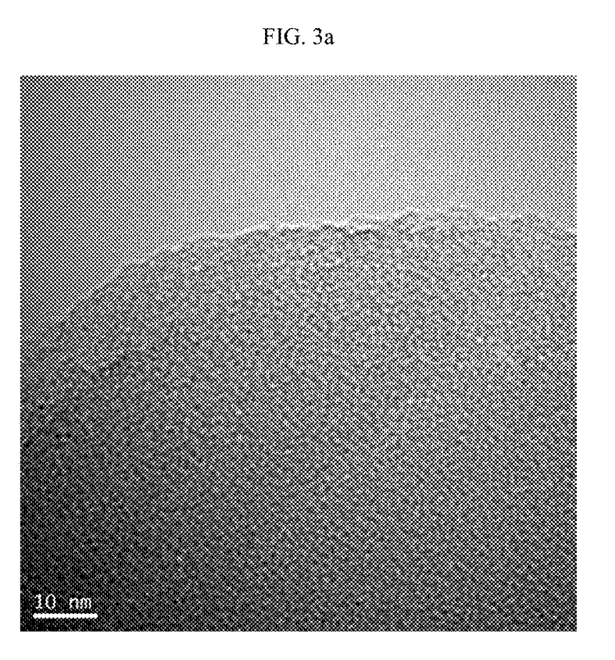
FIG. 3a is a TEM image illustrating the coating layer of the second negative electrode active material according to an embodiment of the present disclosure.
Figure 3B:
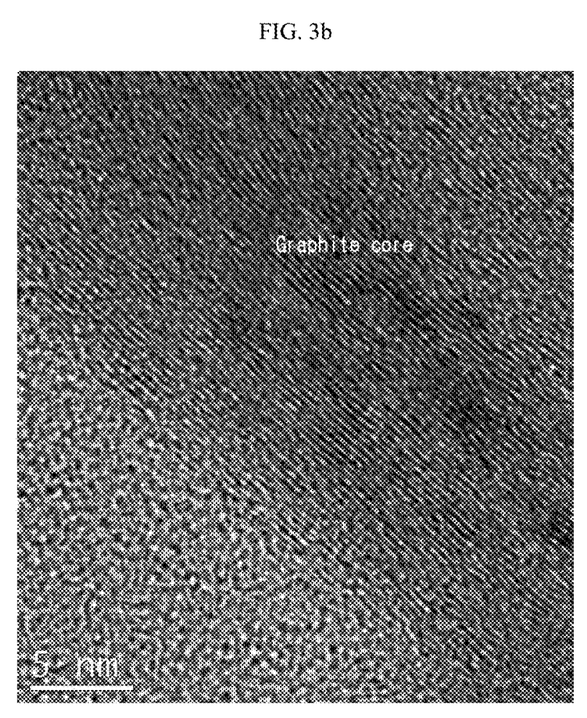
FIG. 3b is a TEM image illustrating the coating layer and core of the second negative electrode active material according to an embodiment of the present disclosure.

FIG. 2 shows a TEM image illustrating the surface coating layer of the first negative electrode active material according to Example 1. FIG. 3a shows a TEM image illustrating the surface coating layer of the second negative electrode active material according to Example 1. While the coating layer in FIG. 2 shows a crystalline carbon structure, the coating layer in FIG. 3a shows an amorphous structure. From the TEM image of FIG. 3b, the crystallinity of the core of the second negative electrode active material and that of the surface coating layer thereof can be compared with each other. Although a sheet-like crystalline structure is observed at the core portion, such a crystalline structure is not present in the surface coating layer.

Test Example 3: Raman Spectroscopy

To determine the crystallinity of the carbon coating layer of the first negative electrode active material and that of the carbon coating layer of the second negative electrode active material according to Example 1, Raman spectroscopy was carried out.

When the carbon coating layer of the second negative electrode active material according to Example 1 was analyzed by Raman spectroscopy, artificial graphite used as core may affect the Raman spectrum of the carbon coating layer. Thus, the Raman spectrum of the carbon coating layer according to Reference Example was analyzed.

Raman spectroscopy was carried out by using Renishaw 2000 Raman microscope system and 532 nm laser excitation. To avoid the laser thermal effect, a 100× optical lens was used at low laser output density with an exposure time of 30 seconds. To reduce a positional deviation, 25 points were determined for a region of 5 μm×5 μm and fitted by using the Lorentzian function. The results are shown in FIG. 4 and the following Table 1 as an average value.

TABLE 1

| | FWHM (Full width at half maximum) of G band (cm$^{-1}$) | FWHM (Full width at half maximum) of D band (cm$^{-1}$) |
|---|---|---|
| Carbon coating layer of the first negative electrode active material | 63.7 ± 3.05 | 68.4 ± 2.51 |
| Carbon coating layer of the second negative electrode active material | 73.1 ± 3.03 | 91.5 ± 8.72 |

Figure 4:
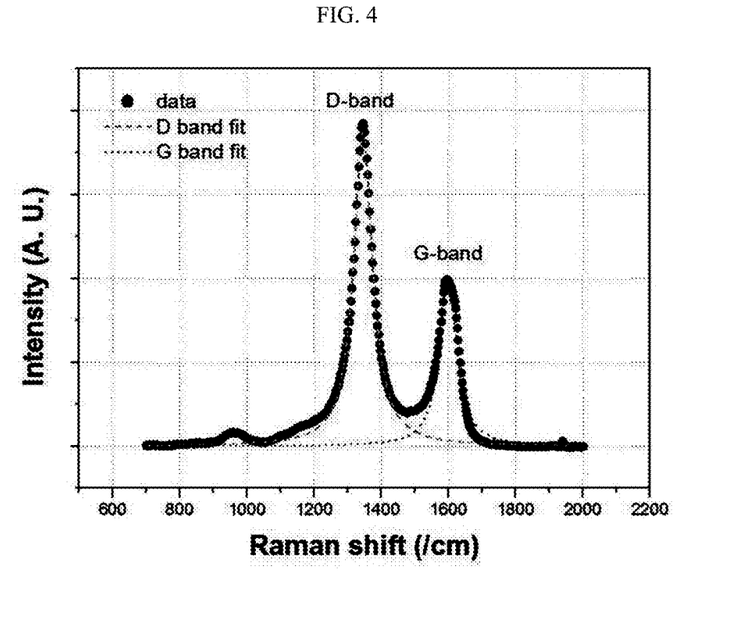
FIG. 4 is a Raman graph illustrating D band and G band of the carbon coating layer of the first negative electrode active material according to Example 1.

Referring to FIG. 4 and Table 1, after the comparison of FWHM values of G band (peak near 1580 cm$^{-1}$) and D band (peak near 1350 cm$^{-1}$), it can be seen that the carbon coating layer of the first negative electrode active material formed by applying methane gas through a CVD process has relatively higher crystallinity as compared to the carbon coating layer of the second negative electrode active material layer formed by using pitch.

What is claimed is:

1. A negative electrode comprising:
a first negative electrode active material comprising a first core comprising a silicon oxide-based composite and a carbon coating layer covering the first core; and
a second negative electrode active material comprising a second core comprising artificial graphite and a carbon coating layer covering the second core,
wherein the silicon oxide-based composite is represented by a formula M—$SiO_x$ (0<x≤2), wherein M is chemically bound to silicon oxide or doped with silicon oxide while reducing silicon oxide and M is an element from Group IIa, VIa or IIIb,
the carbon coating layer of the first core has higher crystallinity compared to the carbon coating layer of the second core, and
M is any one element selected from the group consisting of Mg, Ca, Sr, Ba, Ti, Zr, B and Al.

2. The negative electrode according to claim 1, which comprises only the first negative electrode active material and the second negative electrode active material as the negative electrode active material.

3. The negative electrode according to claim 1, wherein the carbon coating layer of the second core has a larger full width at half maximum (FWHM) value of D band in the Raman spectrum as compared to a FWHM value of D band in the Raman spectrum of the carbon coating layer of the first core.

4. The negative electrode according to claim 3, wherein the FWHM value of D band in the Raman spectrum of the carbon coating layer of the second core is at least 2.1 times larger than the FWHM value of D band in the Raman spectrum of the carbon coating layer of the first core.

5. The negative electrode according to claim 3, wherein the FWHM value of D band in the Raman spectrum of the carbon coating layer of the second core is at least 1.3 times larger than the FWHM value of D band in the Raman spectrum of the carbon coating layer of the first core.

6. The negative electrode according to claim 1, wherein a weight ratio range of the first negative electrode active material to the second negative electrode active material is from 3:97-15:85.

7. The negative electrode according to claim 1, wherein the metal (M) is present in an amount of 4 wt % to 20 wt % based on 100 wt % of the silicon oxide-based composite.

8. The negative electrode according to claim 1, wherein each of the carbon coating layers of the first core and the second core independently has a thickness of 10 nm to 100 nm.

9. A lithium secondary battery comprising the negative electrode as defined in claim 1.

10. The negative electrode according to claim 1, wherein a weight ratio range of the first negative electrode active material to the second negative electrode active material is from 5:95 to 10:90.

* * * * *